(12) United States Patent
Karabulut et al.

(10) Patent No.: US 9,973,997 B1
(45) Date of Patent: May 15, 2018

(54) DATA COMMUNICATION NETWORK TO PROVIDE NETWORK ACCESS DATA SETS FOR USER EQUIPMENT SELECTION OF A WIRELESS RELAY

(71) Applicant: Sprint Communications Company L.P., Overland Park, KS (US)

(72) Inventors: G. Murat Karabulut, Herndon, VA (US); Zheng Fang, McLean, VA (US); Dennis R. Canoy, Ashburn, VA (US)

(73) Assignee: Sprint Communications Company, L.P., Overland Park, KS (US)

( * ) Notice: Subject to any disclaimer, the term of this patent is extended or adjusted under 35 U.S.C. 154(b) by 104 days.

(21) Appl. No.: 15/059,456

(22) Filed: Mar. 3, 2016

(51) Int. Cl.
 *H04W 40/22* (2009.01)
 *H04W 4/06* (2009.01)
 *H04B 7/0413* (2017.01)
 *H04W 76/02* (2009.01)
 *H04W 16/28* (2009.01)

(52) U.S. Cl.
 CPC .......... *H04W 40/22* (2013.01); *H04B 7/0413* (2013.01); *H04W 4/06* (2013.01); *H04W 16/28* (2013.01); *H04W 76/023* (2013.01)

(58) Field of Classification Search
 None
 See application file for complete search history.

(56) References Cited

U.S. PATENT DOCUMENTS

| 7,385,973 | B1 | 6/2008 | Johnson et al. |
| 8,150,397 | B2 | 4/2012 | Khetawat et al. |
| 8,565,129 | B1 | 10/2013 | Bertz et al. |
| 8,699,461 | B2 | 4/2014 | Qian et al. |
| 8,699,462 | B2 | 4/2014 | Spinelli et al. |
| 8,724,648 | B2 | 5/2014 | Zeng et al. |
| 8,787,331 | B2 | 7/2014 | Liu et al. |
| 8,831,679 | B2 | 9/2014 | Bajj et al. |

(Continued)

FOREIGN PATENT DOCUMENTS

| EP | 2485564 | 8/2012 |
| EP | 2645780 | 10/2013 |

(Continued)

OTHER PUBLICATIONS

Giuseppe Ruggeri, et al.; "802.11-Based Wireless-LAN and UMTS interworking: requirements, proposed solutions and open issues;" Computer Networks, Feb. 4, 2005; pp. 151-166; vol. 47, No. 2; Elsevier; Amsterdam, Netherlands.

(Continued)

*Primary Examiner* — Sulaiman Nooristany

(57) ABSTRACT

A data communication network to provide network access data sets for User Equipment (UE) selection of a wireless relay. The wireless relays transfer relay status data to a network control system. The network control system processes the relay status data to generate network access data sets for the wireless relays and transfers the individual network access data sets for delivery to the wireless relays. The wireless relays receive their individual network access data sets and wirelessly broadcast relay Long Term Evolution (LTE) System Information Blocks (SIBs) indicating their individual network access data sets. The wireless relays receive wireless UE attachments responsive to the relay LTE SIB broadcasts of the individual network access data sets.

6 Claims, 8 Drawing Sheets

(56) References Cited

U.S. PATENT DOCUMENTS

| | | |
|---|---|---|
| 9,065,533 B2 | 6/2015 | Teyeb et al. |
| 9,084,150 B2 | 7/2015 | Kazmi et al. |
| 9,094,814 B1 | 7/2015 | Kullman et al. |
| 2003/0174713 A1 | 9/2003 | Linden |
| 2008/0285492 A1 | 11/2008 | Vesterinen |
| 2009/0109858 A1 | 4/2009 | Yamasaki et al. |
| 2009/0161538 A1 | 6/2009 | McGuire |
| 2010/0046418 A1 | 2/2010 | Horn et al. |
| 2010/0322151 A1 | 12/2010 | Racz et al. |
| 2011/0007706 A1 | 1/2011 | Shaikh |
| 2011/0075675 A1 | 3/2011 | Koodli et al. |
| 2011/0103296 A1 | 5/2011 | Ji et al. |
| 2011/0113250 A1 | 5/2011 | Li et al. |
| 2011/0128908 A1 | 6/2011 | Lee et al. |
| 2012/0044908 A1 | 2/2012 | Spinelli et al. |
| 2012/0084840 A1 | 4/2012 | Higuchi et al. |
| 2012/0120831 A1 | 5/2012 | Gonsa et al. |
| 2012/0224536 A1 | 9/2012 | Hahn et al. |
| 2013/0010686 A1 | 1/2013 | Shatzkamer et al. |
| 2013/0028139 A1 | 1/2013 | Sanneck et al. |
| 2013/0044608 A1 | 2/2013 | Qiang et al. |
| 2013/0061034 A1 | 3/2013 | Walheim, Sr. |
| 2013/0176934 A1 | 7/2013 | Malladi et al. |
| 2013/0188481 A1 | 7/2013 | Maehara et al. |
| 2013/0189994 A1 | 7/2013 | Maehara et al. |
| 2013/0315134 A1 | 11/2013 | Halfmann et al. |
| 2013/0324125 A1 | 12/2013 | Bachmann et al. |
| 2013/0336202 A1 | 12/2013 | Oh et al. |
| 2014/0098671 A1 | 4/2014 | Raleigh et al. |
| 2014/0098741 A1 | 4/2014 | Joyce |
| 2014/0106709 A1 | 4/2014 | Palamara et al. |
| 2014/0162544 A1* | 6/2014 | Edge .............. H04W 8/005 455/3.01 |
| 2014/0195655 A1 | 7/2014 | Jha |
| 2014/0204903 A1 | 7/2014 | Kim et al. |
| 2014/0254471 A1 | 9/2014 | Fang et al. |
| 2015/0010010 A1 | 1/2015 | Xie et al. |
| 2015/0029947 A1 | 1/2015 | Gundavelli et al. |
| 2015/0049663 A1* | 2/2015 | Mukherjee ........ H04W 16/26 370/315 |
| 2015/0078173 A1 | 3/2015 | Javed |
| 2015/0092743 A1 | 4/2015 | Ji et al. |
| 2015/0140965 A1 | 5/2015 | Qiang et al. |
| 2015/0155930 A1 | 6/2015 | Liu et al. |
| 2015/0195858 A1 | 7/2015 | Jin et al. |
| 2015/0365414 A1 | 12/2015 | Liang et al. |
| 2016/0142321 A1 | 5/2016 | Gage |
| 2016/0173262 A1 | 6/2016 | Davydov et al. |
| 2016/0192403 A1 | 6/2016 | Gupta et al. |
| 2016/0255021 A1 | 9/2016 | Renfrew |
| 2017/0064579 A1 | 3/2017 | Park et al. |
| 2017/0086165 A1 | 3/2017 | Tarradell et al. |
| 2017/0163685 A1 | 6/2017 | Schwartz et al. |
| 2017/0231020 A1 | 8/2017 | Tomici et al. |

FOREIGN PATENT DOCUMENTS

| | | |
|---|---|---|
| WO | 2011087407 | 7/2011 |
| WO | 2012092966 | 7/2012 |
| WO | 2015005900 | 1/2015 |
| WO | 2015126999 | 8/2015 |

OTHER PUBLICATIONS

Jamshid Khun-Jush; "Integration of WLAN and Wide Area Mobile Networks;" IEEE; Jan. 2002; pp. 1-19; vol. 802.11, No. 02/106; IEEE; Piscataway, New Jersey, U.S.A.

Fumio Teraoka, et al.; "PNEMO: a Network-Based Localized Mobility Management Protocol for Mobile Networks;" IEEE; Jun. 15, 2011; pp. 168-173; IEEE.

Samsung: "Introduction of Relay GW", 3GPP TSG RAN WG3 Meeting #65, R3-091681, 3rd Generation Partnership Project (3GPP), Shezhen, China Aug. 24-28, 2009, Agenda Item: 13.1.2.6; 3 pages.

"3rd Generation Partnership Project; Technical Specification Group Radio Access Network; Evolved Universal Terrestrial Radio Access (E-UTRA); Study on mobile relay (Release 12)", 3GPP draft; 36836-C00, 3rd Generation Partnership Project (3GPP), Mobile Competence Centre; 650, Route Des Lucioles; F-06921 Sophia-Antipolis Cedex; Trance, Jun. 27, 2014, XP050907468, Retrieved from the Internet: URL:http//www.3gpp.org/ftp/Specs/2014-12/Rel-12/36_series/[retreived on Jun. 27, 2014].

CATT (Rapporteur: "Offline discussion on mobile relay architecture options", 3GPP Draft; R3-120423, 3rd Generation Partnership Project (3GPP), Mobile Competence Centre; 650, Route Des Lucioles; F-06921 Sophia-Antipolis Cedex; France, vol. RAN WG3, No. Dresden, Germany; 20120206-20120210, Feb. 10, 2012, KP050566838, retrieved on Feb. 10, 2012, pp. 1-7.

"3rd Generation Partnership Project; Technical Specification Group Radio Access Network; Evolved Universal Terrestrial Radio Access (E-UTRA); Relay Architectures for E-UTRA (LTE-Advanced) (Release 9)", 3GPP Standard; TR 36.806, 3rd Generation Partnership Project (3GPP), Mobile Competence Centre; 650, Route Des Lucioles; F-06921 Sophia-Antipolis Cedex; France, vol. RAN WG2, No. VO.3.1 Jun. 23, 2010, pp. 1-34, XP050553703.

D. Farinacci, et al., Generic Routing Encapsulation (GRE), Network Working Group, Request for comments: 2784; category: Standard Tracks, Mar. 2000, p. 1-9.

Yingrong Coral Sung, et al., "An efficient robust header compression mechanism for Long Term Evolution Advanced Relay Architecture", Network Operations and Management Symposium (APNOMS), 2012 14th Asia-Pacific, IEEE, Sep. 25, 2012, p. 1-4, XP032270869, ISBN: 978-1-4673-4494-4.

S. Alexander, et al; "DHCP Options and BOOTP Vendor Extensions;" Network Working Group; Mar. 1997; pp. 1-34; Request for Comments: 2132.

* cited by examiner

US 9,973,997 B1

DATA COMMUNICATION NETWORK TO PROVIDE NETWORK ACCESS DATA SETS FOR USER EQUIPMENT SELECTION OF A WIRELESS RELAY

TECHNICAL BACKGROUND

Wireless communication networks exchange user data between communication devices to facilitate various data services, like Internet access, voice calling, media streaming, data messaging, and the like. Wireless communication networks allow users to move about as they communicate. A popular form of wireless communication network is Long Term Evolution (LTE). Wireless relays are used to extend the coverage area of wireless networks including LTE networks.

The wireless relays serve user devices and exchange user data with wireless base stations or another network gateway. In LTE networks, femto-cell relays and pico-cell relays exchange user data and user signaling over the air between User Equipment (UE) and eNodeBs. The wireless relays also exchange data and signaling between the UEs and a Secure Gateway (Se-GW) over a Local Area Network/Wide Area Network (LAN/WAN). These wireless relay communications use various combinations of Ethernet, Data over Cable System Interface Specification (DOCSIS), Wave Division Multiplex (WDM), Wireless Fidelity (WIFI), Long Term Evolution (LTE), WIFI/LTE Aggregation (LWA), or some other data communication protocol.

Wireless relays and other wireless access points broadcast System Information Blocks (SIBs) that include network information. For instance, the SIB-9 includes information related to a wireless relay's Home eNodeB. UEs can use the network information broadcasted in the SIBs to attach to a wireless access point/communication network.

OVERVIEW

Examples disclosed herein provide a system, method, hardware, and software to provide network access data sets for User Equipment (UE) selection of a wireless relay. A data communication network comprises wireless relays that serve UEs. The wireless relays transfer relay status data to a network control system. The network control system processes the relay status data to generate individual network access data sets for the wireless relays. The network control system transfers the individual network access data sets for delivery to the wireless relays. The wireless relays receive their individual network access data sets and wirelessly broadcast relay Long Term Evolution (LTE) System Information Blocks (SIBs) indicating their individual network access data sets. The wireless relays receive wireless UE attachments responsive to the relay LTE SIB broadcasts of the individual network access data sets.

In another example, a data communication network provides network access data sets for UE selection of a wireless relay. The data communication network comprises wireless relays that serve UEs. The wireless relays transfer relay status data to a network control system. The network control system processes the relay status data to generate individual network access data sets for the wireless relays. The network control system transfers the individual network access data sets for delivery to the wireless relays. The wireless relays receive their individual network access data sets and wirelessly broadcast relay LTE SIBs indicating their individual network access data sets. The wireless relays receive wireless UE attachments responsive to the relay LTE SIB broadcasts of the individual network access data sets.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention, and that the features described below can be combined in various ways to form multiple variations of the invention. As a result, the invention is not limited to the specific examples described below, but only by the claims and their equivalents.

Figure 1:
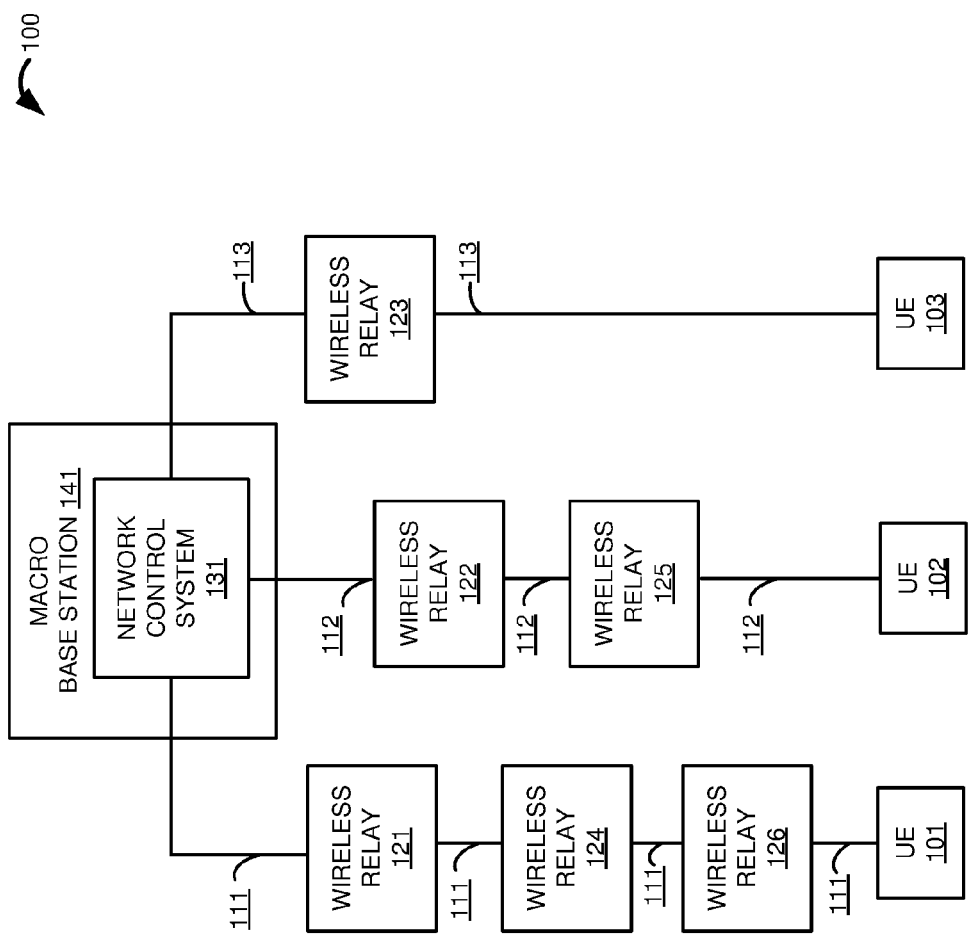
FIG. 1 illustrates a data communication network to provide network access data sets for User Equipment (UE) selection of a wireless relay.

FIG. 1 illustrates data communication network 100 to provide network access data sets for User Equipment (UE) selection of a wireless relay. Data communication network 100 includes macro base station 141, network control system 131, wireless relays 121-126, UEs 101-103, and communication links 111-113. In this example, network control system 131 is included as part of macro base station 141, although alternate configurations are possible. Communication link 111 connects network control system 131, wireless relay 121, wireless relay 124, wireless relay 126, and UE 101. Communication link 112 connects network control system 131, wireless relay 122, wireless relay 125, and UE 102. Communication link connects wireless relay 123 and UE 103.

Communication links 111-113 may use any of a variety of communication media, such as air, metal, optical fiber, or any other signal propagation path, including combinations thereof. Also, communication links 111-113 may use any of a variety of communication protocols, such as Internet, telephony, optical networking, wireless communication, Wireless Fidelity (WIFI), Long Term Evolution (LTE), or any other communication protocols and formats, including combinations thereof. Communication links 111-113 could be a direct link or may include intermediate networks, systems, or devices. Communication links 111-113 are representative and may vary.

In some examples, macro base station 141 may comprise an eNodeB. Although not required, wireless relays 121-126 may comprise femto-cell and pico-cell base stations. Examples of UEs 101-103 include wireless communication devices such as a telephone, cellular phone, mobile phone, smartphone, Personal Digital Assistant (PDA), laptop, computer, e-book, eReader, mobile Internet appliance, or some other wireless communication device with a wireless transceiver—including combinations thereof.

In operation, wireless relays 121-126 transfer relay status data to network control system 131. In some examples, relay status data includes wireless relay capabilities data (e.g. Beam Forming (BF), Carrier Aggregation (CA), Voice over LTE (VoLTE), Device-to-Device (D2D), Video over LTE (ViLTE)), transmission power, average SNR, average RF signal quality, average latency, number of simultaneous users, location, SNR, load, and/or other relay status data—including combinations thereof.

Network control system 131 processes the relay status data to generate individual network access data sets for wireless relays 121-126. Examples of network access data include a relay network ID, WIFI Service Set Identifier (SSID), Public Land Mobile Network (PLMN) ID, media service name, voice calling service name, video calling service name, audio streaming service name, video streaming service name, Radio Frequency (RF) service name, Multiple Input Multiple Output (MIMO) service name, Carrier Aggregation (CA) service name, Beam Forming (BF) service name, Device-to-Device service name, Voice over LTE (VoLTE) service name, maximum/minimum bandwidth data, number of supported UEs, latency data, mobility data, number of hops to the eNodeB/core network, backhaul spectrum used (licensed/unlicensed), and/or other network access data—including combinations thereof.

Network control system 131 transfers the individual network access data sets for delivery to wireless relays 121-126. Wireless relays 121-126 receive their individual network access data sets and wirelessly broadcast relay LTE System Information Blocks (SIBs) indicating their individual network access data sets. In some examples, wireless relays 121-126 broadcast their individual network access data sets in the SIB-9.

Wireless relays 121-126 receive wireless UE attachments from UEs 101-103, responsive to the relay LTE SIB broadcasts of the individual network access data sets. A UE may select a wireless relay based on the service requested. For example, UE 101 may request a video streaming service and select wireless relay 126 based on media service name information in the SIB-9 of wireless relay 126 that indicates that wireless relay 126 is capable of providing video streaming service. In other examples, a populated SIB-9 indicates the wireless access point is a wireless relay and a UE or other device requesting service should avoid attaching to wireless access points with populated SIB-9.

Figure 2:
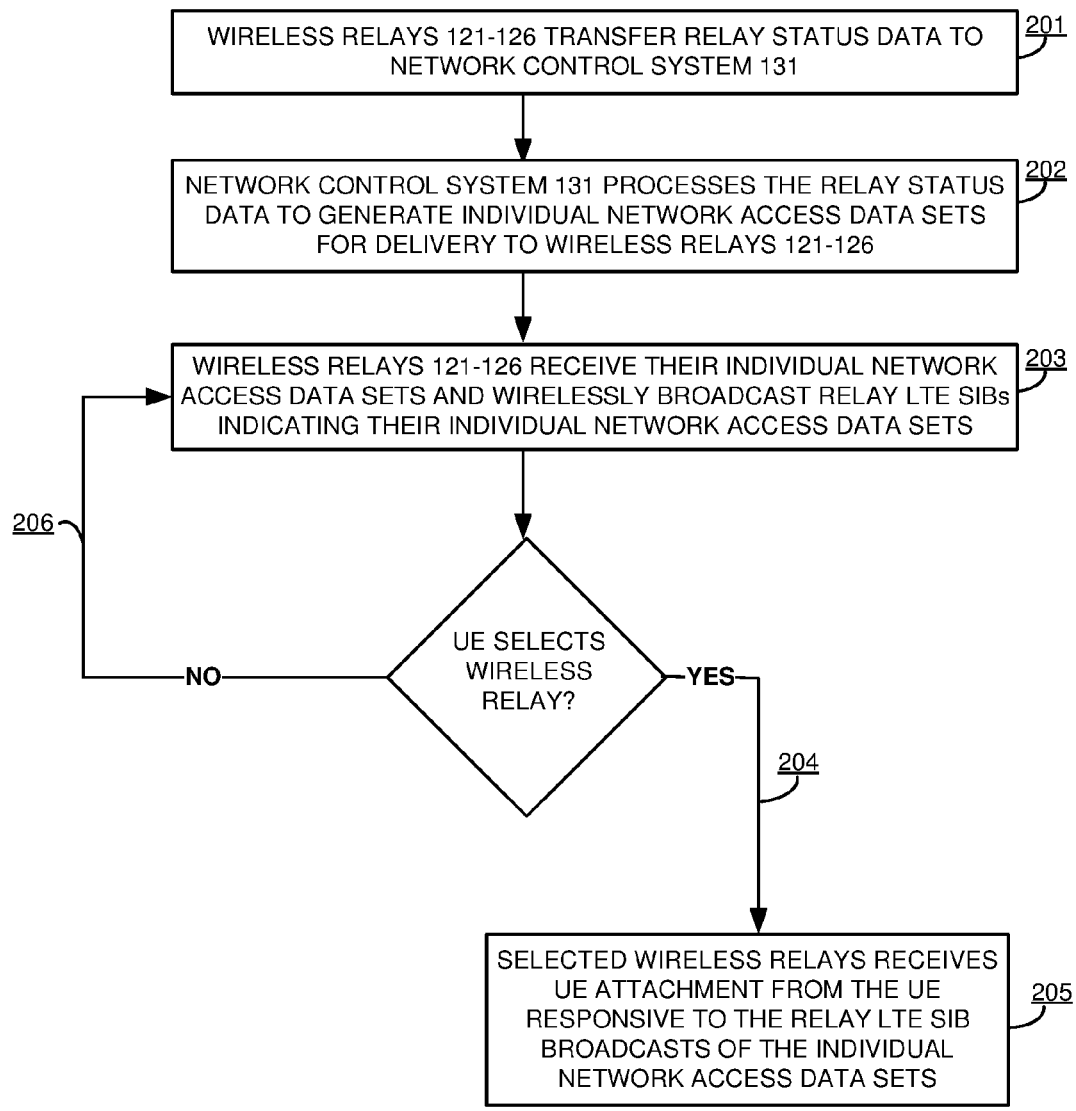
FIG. 2 illustrates the operation of the data communication network to provide network access data sets for UE selection of the wireless relay.

FIG. 2 illustrates the operation of data communication network 100 to provide network access data sets for UEs 101-103 selection of wireless relays 121-126. Data communication network 100 comprises wireless relays 121-126 that serve UEs 101-103. Wireless relays 121-126 transfer relay status data to network control system 131 (201). In some examples, wireless relays will transfer relay status data upon power up, such as when a wireless relay is first installed. Although not required, wireless relays 121-126 may periodically transfer their relay status data to network control system 131. Wireless relays 121-126 may transfer relay status data over a LTE—WIFI link Aggregation (LWA) connection or a LTE Robust Header Compression (RoHC) connection.

Network control system 131 processes the relay status data to generate individual network access data sets for delivery to wireless relays 121-126 (202). In some examples, network control system 131 aggregates and stores all the individual network access data sets. Although not required, network control system 131 may broadcast the network access data sets in its LTE SIBs.

Wireless relays 121-126 receive their individual network access data sets and wirelessly broadcast relay LTE SIBs indicating their individual network access data sets (203). If a UE selects a wireless relay to from wireless relays 121-126 (204), then the selected wireless relay receives wireless a UE attachment from the UE, responsive to the relay LTE SIB broadcasts of the individual network access data sets (205). If the UE does not select a wireless relay from wireless relays 121-126 (206), then wireless relays 121-126 continue to broadcast their individual network access data sets in their LTE SIBs.

Figure 3:
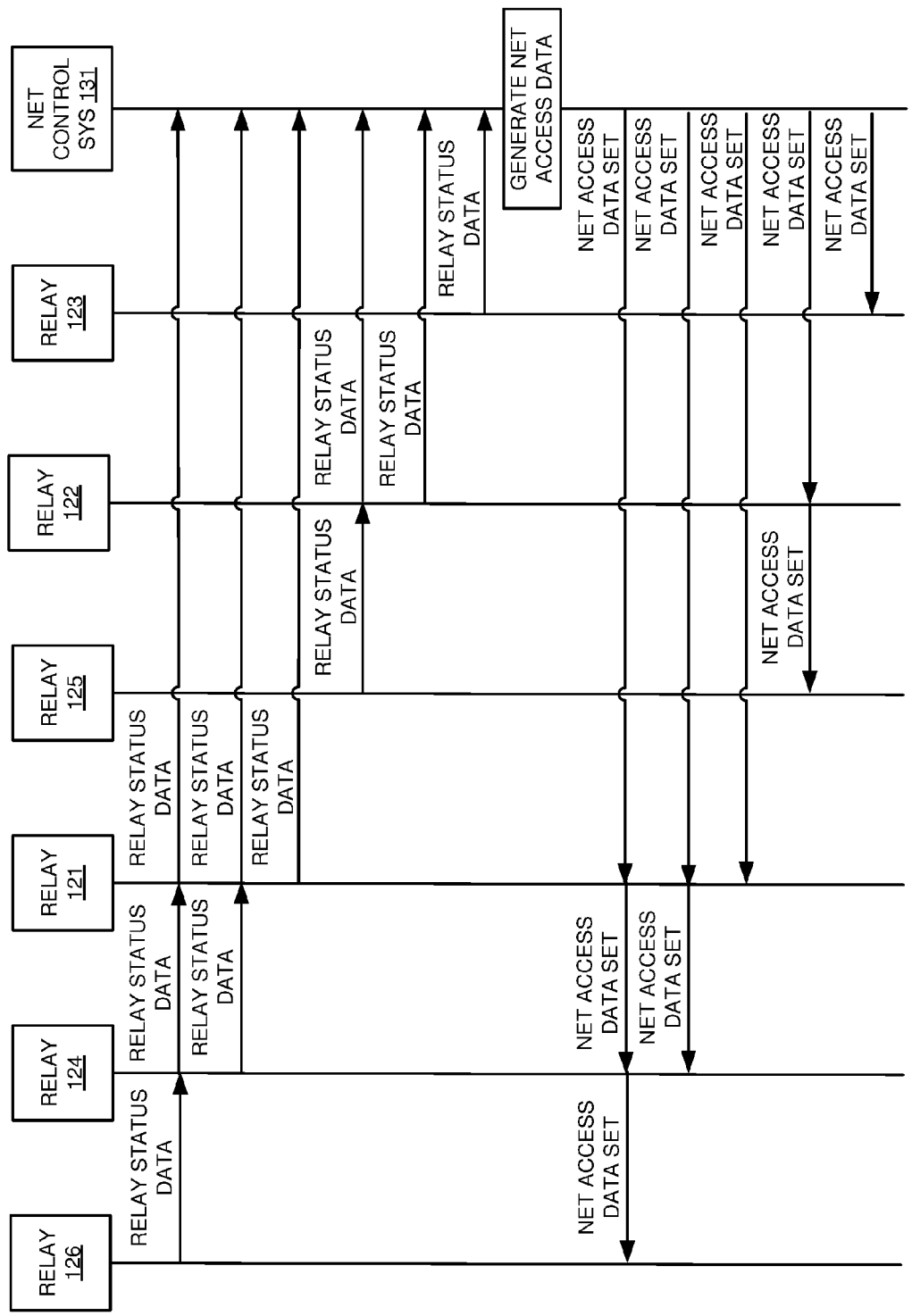
FIG. 3 illustrates the operation of the data communication network to provide network access data sets for UE selection of the wireless relay.

FIG. 3 illustrates the operation of data communication network 100 to provide network access data sets for UE selection of wireless relays 121-126. Data communication network 100 comprises wireless relays 121-126 that serve UEs 101-103. Relay status data is transferred from wireless relay 126 to wireless relay 124 to wireless relay 121. Wireless relay 124 transfers relay status data to wireless relay 121. Although not required, wireless relay 121 may aggregate the relay status data for wireless relays 121, 124, and 126 before transferring to network control system 131. In other examples, relay status data for wireless relays 124 and 126 is only transferred through wireless relay 121. Wireless relay 125 transfers relays status data to wireless relay 122, which transfers the relay status data to network control system 131. Wireless relay 123 transfers relay status data to network control system 131. In some examples, relay status data is transferred directly from each wireless relay to network control system 131.

Network control system 131 processes the relay status data to generate individual network access data sets for delivery to wireless relays 121-126. Wireless relays 121-126 receive their individual network access data sets from network control system 131 and wirelessly broadcast relay LTE SIBs indicating their individual network access data sets.

Figure 4:
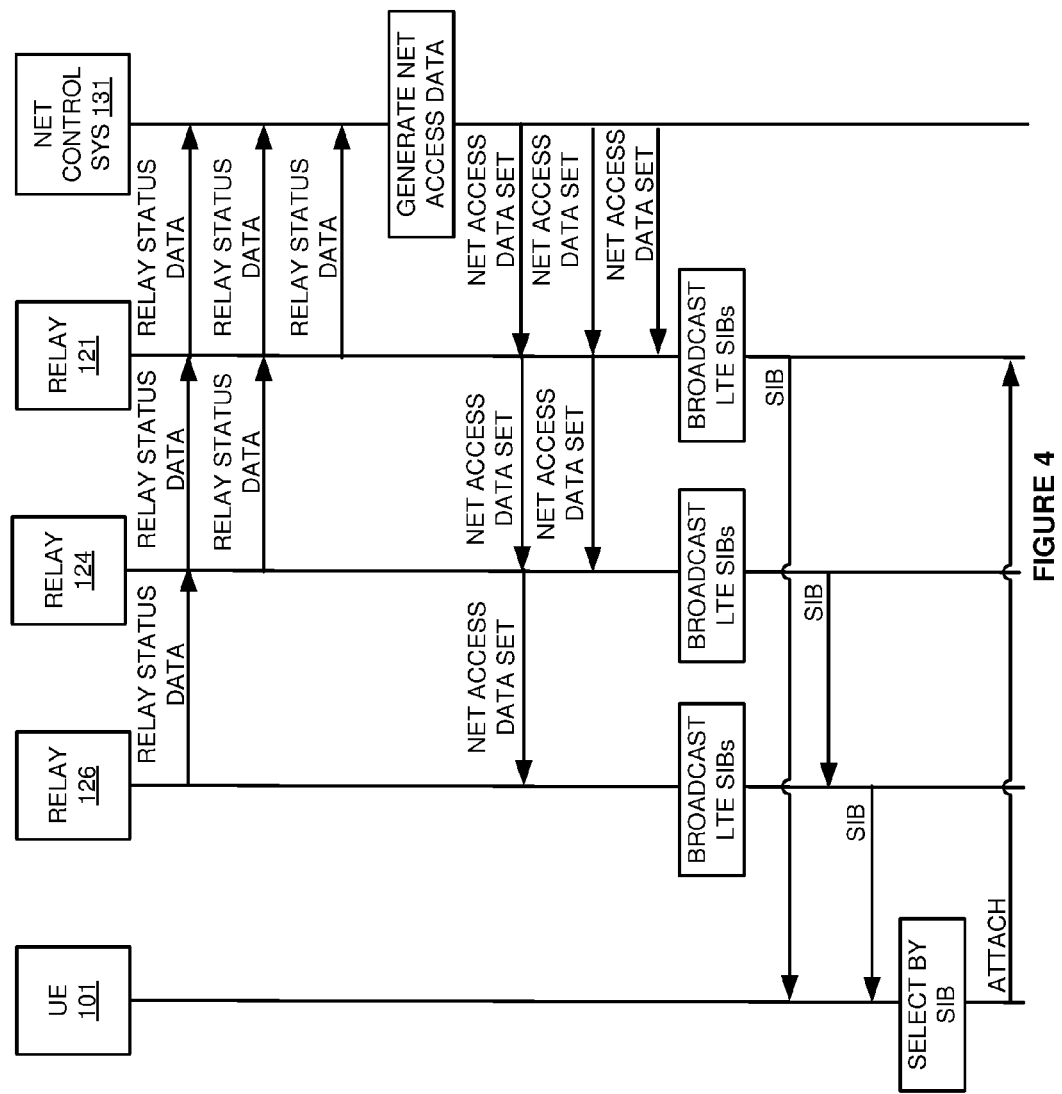
FIG. 4 illustrates the operation of the data communication network to provide network access data sets for UE selection of the wireless relay.

FIG. 4 illustrates the operation of data communication network to provide network access data sets for UE selection of a wireless relay. Wireless relay 126 transfers relay status data to wireless relay 124, from wireless relay 124 to wireless relay 121, and from wireless relay 121 to network control system 131. Wireless relay 124 transfers relay status data to wireless relay 121, which transfers relay status data to network control 131. Wireless relay 121 transfers relay status data to network control system 131.

Network control system 131 processes the relay status data to generate individual network access data sets for delivery to wireless relays 121, 124, and 126. Wireless relays 121, 124, and 126 receive their individual network access data sets from network control system 131 and wirelessly broadcast relay LTE SIBs indicating their individual network access data sets. Although not required, a wireless relay may have network access data sets for other connected wireless relays. For example, wireless relay 121 may have network access data sets for wireless relays 121, 124, and 126; wireless relay 124 may have network access data sets for wireless relay 124 and 126; and wireless relay 126 has network access data set for only wireless relay 126. UE 101 receives SIB information broadcasted by wireless relays 121, 124, and 126. UE selects a wireless relay based on the network access data information in the broadcasted SIBs and sends an attach request to selected wireless relay 121.

Although not required, UE 101 may comprise a hotspot device (i.e. a device that offers a wireless communication connection to other devices). UE 101 receives network access data from the broadcasted SIBs and detects that wireless relay 126 comprise a femto-cell base stations, wireless relay 124 comprises a pico-cell base station, and wireless relay 121 comprises an eNodeB. UE 101 selects wireless relay 121 to avoid connecting to a femto-cell or pico-cell base station.

Figure 5:
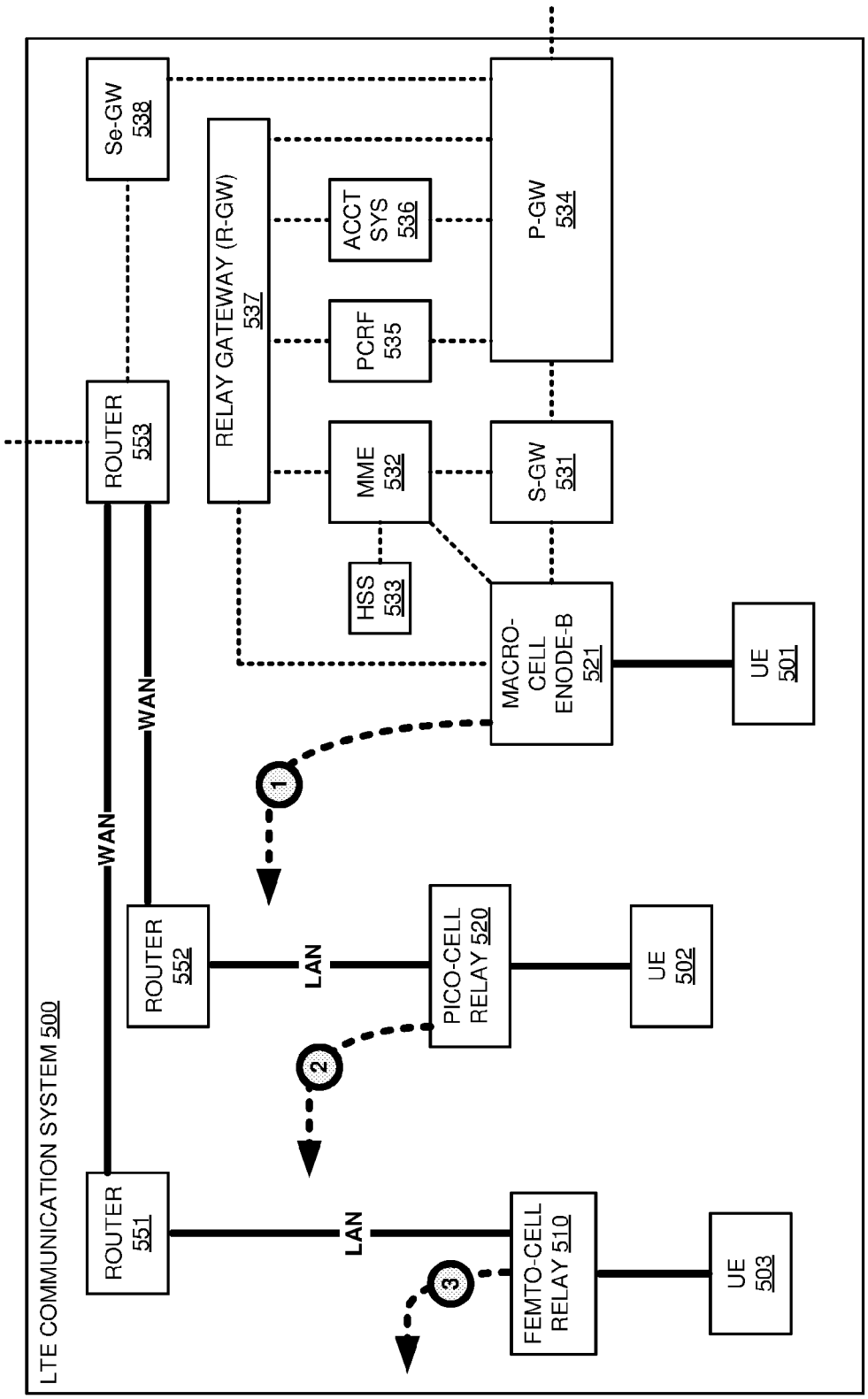
FIG. 5 illustrates a Long Term Evolution (LTE) data communication network to provide network access data sets for UE selection of a wireless relay.

FIG. 5 illustrates LTE communication system 500 to provide network access data sets for UE selection of a wireless relay. LTE communication system 500 comprises: UEs 501-503, femto-cell relay 510, pico-cell relay 520, macrocell eNodeB 521, Serving Gateway (S-GW) 531, Mobility Management Entity (MME) 532, Home Subscriber System (HSS) 533, Packet Data Network Gateway (P-GW) 534, Policy and Charging Rules Function (PCRF) 535, Accounting system (ACCT) 536, R-GW 537, Security Gateway (Se-GW) 538, and routers 551-553.

Femto-cell relay 510 is coupled to router 551 over a Local Area Network (LAN) such as an Ethernet LAN. Router 551 is coupled to router 553 over a Wide Area Network (WAN) such as a Data Over Cable Service Information Specification (DOCSIS) system, Time Division Multiplex (TDM), Wave Division Multiplexing (WDM), Ethernet, or some other data network. Pico-cell relay 520 is coupled to router 552 over a LAN. Router 552 is coupled to router 553 over a WAN. Router 553 is coupled to Se-GW 538. The number and configuration of routers illustrated is representative and may vary.

To attract UEs, femto-cell relay 510, pico-cell relay 520, and macro-cell eNodeB 521 broadcast network access data in their LTE SIBs. For example, femto-cell relay 510, pico-cell relay 520, and macro-cell eNodeB 521 may broadcast multiple PLMN IDs based on their individual service capabilities.

Referring to the circled number one on FIG. 5, macro-cell eNodeB 521 broadcasts a PLMN ID of MACRO RELAY to attract wireless relays like femto-cell relay 510 and pico-cell relay 520. Macro-cell eNodeB 521 may also broadcast PLMN IDs for MACRO UE DATA and MACRO UE VOLTE to attract UEs like UE 501. Likewise, pico-cell relay 520 broadcasts PLMN IDs for PICO UE DATA, PICO UE VOLTE, and PICO RELAY. Femto-cell relay 510 broadcasts PLMN IDs for FEMTO UE DATA and FEMTO UE VOLTE. A PLMN ID is typically associated with one or more Access Point Names (APNs) that are selected by MME 532 and HSS 533 when a UE attaches using that PLMN ID.

To attract UEs using WIFI, femto-cell relay 510, pico-cell relay 520, and macro-cell eNodeB 521 may also broadcast various WIFI Service Set Identifiers (SSIDs). For example, a pico-cell SSID might be as simple as "PICO 420" or be more complex like "PICO 420 RELAY," "PICO 420 UE DATA," or "PICO 420 UE VOLTE."

The relays may exchange wireless data communications using LTE/WIFI Aggregation (LWA). With LWA, the relays may communicate over unlicensed spectrum at 2.4 GHz, 5 GHz, or some other band. In addition, the relay may communicate over licensed spectrum between 0.3 GHz-3 GHz or some other band. Thus, the relays may communicate using LTE or WIFI over licensed or unlicensed spectrum.

Figure 6:
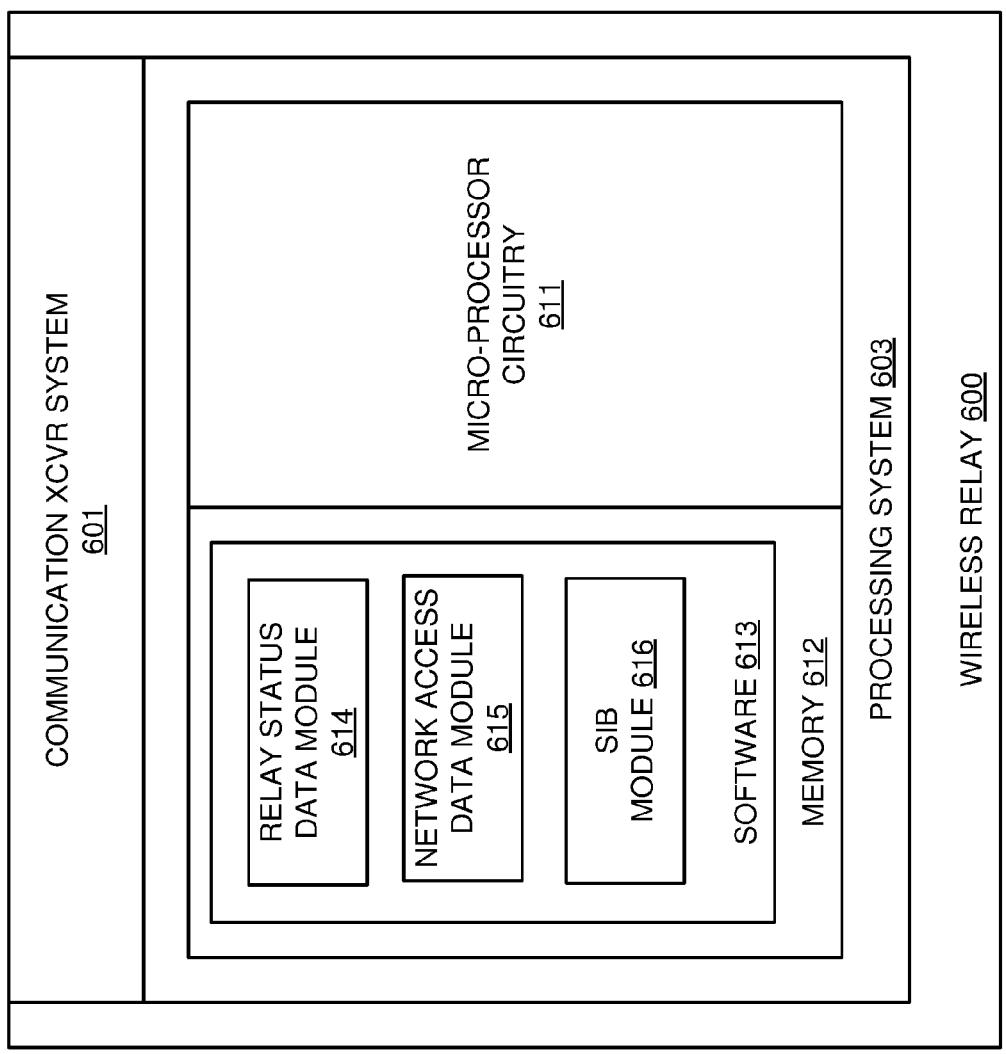
FIG. 6 illustrates an example of a wireless relay.

FIG. 6 illustrates wireless relay 600. Wireless relay 600 is an example of wireless relays 121-126 and femto-cell relay 510, pico-cell relay 520, and macro-cell eNodeB 521. Although these systems may use alternative configurations and operations. Wireless relay 600 comprises communication transceiver system 601 and processing system 603. Processing system 603 includes micro-processor circuitry 611 and memory 612 that stores software 613. Software 613 comprises software modules 614-616.

Communication transceiver system 601 comprises components that communicate over communication links such as network cards, ports, RF transceivers, processing circuitry and software, or some other communication components. Communication transceiver system 601 may be configured to communicate over metallic, wireless, or optical links. Communication transceiver system 601 may be configured to use TDM, IP, Ethernet, optical networking, wireless protocols, communication signaling, or some other communication format—including combinations thereof. Communication transceiver system 601 may receive and transfer registration requests. Communication transceiver system 601 may also be configured to communicate using wireless communication protocols such as LTE.

Processor circuitry 611 comprises microprocessor and other circuitry that retrieves and executes operating software 613 from memory 612. Processor circuitry 611 may comprise a single device or could be distributed across multiple devices—including devices in different geographic areas. Processor circuitry 611 may be embedded in various types of equipment. Examples of processor circuitry 611 include central processing units, application-specific processors, logic devices, and/or any type of computer processing devices—including combinations thereof.

Memory 612 comprises a non-transitory computer readable storage medium readable by processing system 603 and capable of storing software 613, such as a disk drive, flash drive, data storage circuitry, or some other hardware memory apparatus—including combinations thereof. Memory 612 can include volatile and non-volatile, removable and non-removable media implemented in any method or technology for storage of information, such as computer readable instructions, data structures, program modules, or other data—including combinations thereof. Memory 612 may comprise a single device or could be distributed across multiple devices—including devices in different geographic areas. Memory 612 may be embedded in various types of equipment. In some examples, a computer apparatus could comprise memory 612 and software 613.

Software 613 comprises computer programs, firmware, or some other form of machine-readable processing instructions. Software 613 may include an operating system, utilities, drivers, network interfaces, applications, or some other type of software. In this example, software 613 comprises relay status data module 614, network access data set module 615, and SIB module 616. Although software 613 could have alternative configurations in other examples.

Software 613 may be implemented in program instructions and may be executed by processing system 603. Software 613 may include additional processes, programs, or components, such as operating system software, database software, or application software—including combinations thereof. Software 613 may also comprise firmware or some other form of machine-readable processing instructions executable by processing system 603.

When executed, software 613 directs processing system 603 to operate as described herein to provide network access data sets for UE selection of a wireless relay. In particular, relay status data module 614 directs processing system 603 to perform transfer relay status data to the network control system. In some examples, relay status data module 614 may also comprise processing information to generate the relay status data.

Network access data sets module 615 directs processing system 603 to receive the individual network access data set for the wireless relay from the network control system. Although, not required network access data sets module 615 may also process the individual network access data set for the wireless relay to generate the LTE SIB information. SIB module 616 directs processing system 603 to broadcast the relay LTE SIBs indicating the network access data set for the wireless relay. In some examples, SIB module 616 processes the individual network access data set for the wireless relay to generate the LTE SIB information.

Figure 7:
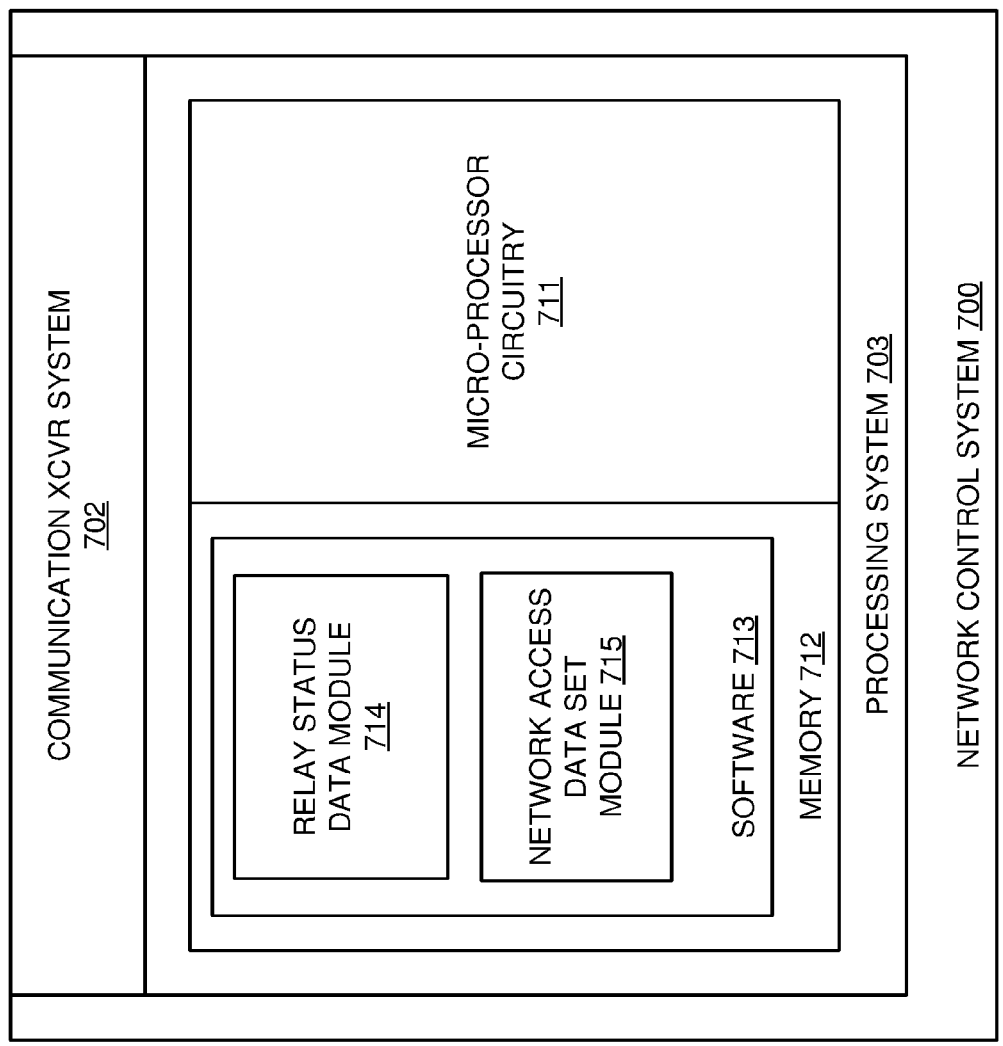
FIG. 7 illustrates an example of a network control system.

FIG. 7 illustrates network control system 700. Network control system 700 is an example of network control system 131 and macro-cell eNodeB 521. Although these systems may use alternative configurations and operations. Network control system 700 comprises communication transceiver system 702 and processing system 703. Processing system 703 includes processing circuitry 711 and memory system 712 that stores software 713. Software 713 comprises software modules 714-715.

Communication transceiver system 702 comprise components that communicate over communication links such as network cards, ports, RF transceivers, processing circuitry and software, or some other communication components. Communication transceiver system 702 may be configured to communicate over metallic, wireless, or optical links. Communication transceiver system 702 may be configured to use TDM, IP, Ethernet, optical networking, wireless protocols, communication signaling, or some other communication format—including combinations thereof. Communication transceiver system 702 may receive and transfer registration requests.

Processor circuitry 711 comprises microprocessor and other circuitry that retrieves and executes operating software 713 from memory system 712. Processor circuitry 711 may comprise a single device or could be distributed across multiple devices—including devices in different geographic areas. Processor circuitry 711 may be embedded in various types of equipment. Examples of processor circuitry 711 include central processing units, application-specific processors, logic devices, and/or any type of computer processing devices—including combinations thereof.

Memory system 712 comprises a non-transitory computer readable storage medium readable by processing system 703 and capable of storing software 713, such as a disk drive, flash drive, data storage circuitry, or some other hardware memory apparatus—including combinations thereof. Memory system 712 can include volatile and non-volatile, removable and non-removable media implemented in any method or technology for storage of information, such as computer readable instructions, data structures, program modules, or other data—including combinations thereof. Memory system 712 may comprise a single device or could be distributed across multiple devices—including devices in different geographic areas. Memory system 712 may be embedded in various types of equipment. In some examples, a computer apparatus could comprise memory system 712 and software 713.

Software 713 comprises computer programs, firmware, or some other form of machine-readable processing instructions. Software 713 may include an operating system, utilities, drivers, network interfaces, applications, or some other type of software. In this example, software 713 comprises relay status data module 714 and network access data set module 715. Although software 713 could have alternative configurations in other examples.

Software 713 may be implemented in program instructions and may be executed by processing system 703. Software 713 may include additional processes, programs, or components, such as operating system software, database software, or application software—including combinations thereof. Software 713 may also comprise firmware or some other form of machine-readable processing instructions executable by processing system 703.

When executed, software 713 directs processing system 703 to operate as described herein to provide network access data sets for UE selection of a wireless relay. In particular, relay status data module 714 directs processing system 703 to receive relay status data from the wireless relays. Network access data set module 715 directs processing system 703 to process relay status data and generate network access data sets for the wireless relays. Network access data set module 715 also directs processing system 703 to transfer the network access data sets to the wireless relays.

Figure 8:
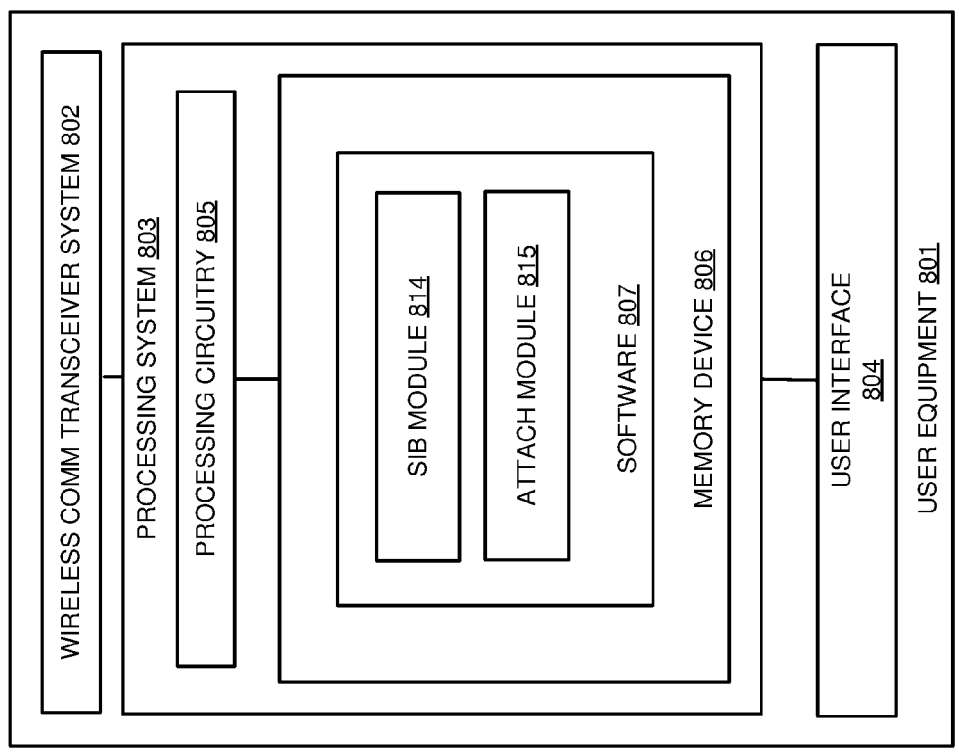
FIG. 8 illustrates an example of a UE.

FIG. 8 illustrates User Equipment (UE) 801. UE 801 is an example of UEs 101-103 and UEs 501-503, although UEs 101-103 and UEs 501-503 could use alternative configurations. UE 801 comprises wireless communication transceiver system 802, processing system 803, and user interface 804. Processing system 803 is linked to wireless communication transceiver system 802 and user interface 804. Processing system 803 includes processing circuitry 805 and memory device 806 that stores operating software 807. UE 801 may include other well-known components such as a battery and enclosure that are not shown for clarity. UE 801 may be a telephone, cellular phone, mobile phone, smartphone, personal digital assistant (PDA), computer, laptop, tablet, e-book, mobile Internet appliance, media player, game console, wireless network interface card, or some other wireless communication apparatus—including combinations thereof.

Wireless communication transceiver system 802 comprises RF communication circuitry and an antenna. The RF communication circuitry typically includes an amplifier, filter, RF modulator, and signal processing circuitry. Wireless communication transceiver system 802 may also include a memory device, software, processing circuitry, or some other communication device. Wireless communication transceiver system 802 may use various communication formats, such as LTE, CDMA, EVDO, WIMAX, GSM, WIFI, HSPA, or some other wireless communication format—including combinations thereof.

User interface 804 comprises components that interact with a user to receive user inputs and to present media and/or information. User interface 804 may include a speaker, microphone, buttons, lights, display screen, touch screen, touch pad, scroll wheel, communication port, or some other user input/output apparatus—including combinations thereof. User interface 804 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Processing circuitry 805 is typically mounted on a circuit board that may also hold memory device 806, portions of wireless communication transceiver system 802, and user interface 804. Operating software 807 comprises computer programs, firmware, or some other form of machine-readable processing instructions. Operating software 807 may include an operating system, utilities, drivers, network interfaces, applications, or some other type of software. When executed by processing circuitry 805, operating software 807 directs processing system 803 to operate user equipment 801 as described herein.

When executed, software 807 directs processing system 803 to operate as described herein to use network access data sets to select a wireless relay. In particular, SIB module 814 directs processing system 803 to scan for network access data in relay LTE SIBs. Attach module 815 directs processing system 803 to attach to the selected wireless relay. The wireless relay may be selected based on the requested service (i.e. VoLTE). In other examples, the UE may select the wireless relay based on the number of users (i.e. load) or location (i.e. closest wireless relay or strongest RF signal).

Referring back to FIG. 1, UEs 101-103 comprise Radio Frequency (RF) communication circuitry and an antenna. The RF communication circuitry typically includes an amplifier, filter, modulator, and signal processing circuitry. UEs 101-103 may also include a user interface, memory device, software, processing circuitry, or some other communication components. UEs 101-103 may be a telephone, computer, e-book, mobile Internet appliance, wireless network interface card, media player, game console, or some other wireless communication apparatus—including combinations thereof.

Wireless relays 121-126 comprise RF communication circuitry and an antenna. The RF communication circuitry typically includes an amplifier, filter, RF modulator, and signal processing circuitry. Wireless relays 121-126 may also comprise a router, server, memory device, software, processing circuitry, cabling, power supply, network communication interface, structural support, or some other communication apparatus. Wireless relays 121-126 could be a femto-cell base station, pico-cell base station, WIFI hotspot, or some other wireless access point—including combinations thereof.

Network control system 131 comprises a computer system and communication interface. Network control system 131 may also include other components such as a router, server, data storage system, and power supply. Network control system 131 may reside in a single device or may be distributed across multiple devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication network to serve User Equipment (UEs), the method comprising:
    macrocell base stations wirelessly broadcasting a macro-relay Public Land Mobile Network Identifier (PLMN ID);
    picocell relays attaching to the macrocell base stations responsive to the broadcast macro-relay PLMN ID;
    the picocell relays wirelessly broadcasting a pico-relay PLMN ID;
    femtocell relays attaching to the picocell relays responsive to the broadcast pico-relay PLMN ID;
    the macrocell base stations wirelessly broadcasting a macro-UE PLMN ID wherein the UEs attach to the macrocell base station responsive to the broadcast macro-UE PLMN ID;
    the picocell relays wirelessly broadcasting a pico-UE PLMN ID wherein the UEs attach to the picocell relays responsive to the broadcast pico-UE PLMN ID; and
    the femtocell relays wirelessly broadcasting a femto-UE PLMN ID wherein the UEs attach to the femtocell relays responsive to the broadcast femto-UE PLMN ID.

2. The method of claim 1 further comprising:
    the macrocell base stations wirelessly broadcasting picocell data sets indicating the pico-relay PLMN ID and the pico-UE PLMN ID in Long Term Evolution (LTE) macrocell System Information Blocks (SIBs);
    the macrocell base stations wirelessly broadcasting femtocell data sets indicating the femto-UE PLMN ID in the LTE macrocell SIBs;
    the picocell relays wirelessly receiving the picocell data sets indicating the pico-relay PLMN ID and the pico-UE PLMN ID from the LTE macrocell SIBs;
    the picocell relays wirelessly receiving the femtocell data sets indicating the femto-UE PLMN ID from the LTE macrocell SIBs;
    the picocell relays wirelessly broadcasting the femtocell data sets indicating the femto-UE PLMN ID in LTE picocell SIBs; and
    the femtocell relays wirelessly receiving the femtocell data sets indicating the femto-UE PLMN ID from the LTE picocell SIBs.

3. The method of claim 1 further comprising:
    the picocell relays wirelessly transferring picocell relay status data to a network control system and responsively wirelessly receiving picocell data sets indicating the pico-relay PLMN ID and the pico-UE PLMN ID; and
    the femtocell relays wirelessly transferring femtocell relay status data to the network control system and responsively wirelessly receiving femtocell data sets indicating the femto-UE PLMN ID.

4. A wireless communication network to serve User Equipment (UEs), the wireless communication network comprising:
    macrocell base stations configured to wirelessly broadcast a macro-relay Public Land Mobile Network Identifier (PLMN ID);
    picocell relays configured to attach to the macrocell base stations responsive to the broadcast macro-relay PLMN ID;
    the picocell relays configured to wirelessly broadcast a pico-relay PLMN ID;
    femtocell relays configured to attach to the picocell relays responsive to the broadcast pico-relay PLMN ID;

the macrocell base stations configured to wirelessly broadcast a macro-UE PLMN ID wherein the UEs are configured to attach to the macrocell base station responsive to the broadcast macro-UE PLMN ID;

the picocell relays configured to wirelessly broadcast a pico-UE PLMN ID wherein the UEs are configured to attach to the picocell relays responsive to the broadcast pico-UE PLMN ID; and the femtocell relays configured to wirelessly broadcast a femto-UE PLMN ID wherein the UEs are configured to attach to the femtocell relays responsive to the broadcast femto-UE PLMN ID.

5. The wireless communication network of claim 4 further comprising:

the macrocell base stations are configured to wirelessly broadcast picocell data sets indicating the pico-relay PLMN ID and the pico-UE PLMN ID in Long Term Evolution (LTE) macrocell System Information Blocks (SIBs);

the macrocell base stations are configured to wirelessly broadcast femto cell data sets indicating the femto-UE PLMN ID in the LTE macrocell SIBs;

the picocell relays are configured to wirelessly receive the picocell data sets indicating the pico-relay PLMN ID and the pico-UE PLMN ID from the LTE macrocell SIBs;

the picocell relays are configured to wirelessly receive the femtocell data sets indicating the femto-UE PLMN ID from the LTE macrocell SIBs;

the picocell relays are configured to wirelessly broadcast the femtocell data sets indicating the femto-UE PLMN ID in LTE picocell SIBs; and the femtocell relays are configured to wirelessly receive the femtocell data sets indicating the femto-UE PLMN ID from the LTE picocell SIBs.

6. The wireless communication network of claim 4 further comprising:

the picocell relays are configured to wirelessly transfer picocell relay status data to a network control system and responsively wirelessly receive picocell data sets indicating the pico-relay PLMN ID and the pico-UE PLMN ID; and the femtocell relays are configured to wirelessly transfer femtocell relay status data to the network control system and responsively wirelessly receive femtocell data sets indicating the femto-UE PLMN ID.

* * * * *